H. W. SANDERS.
CLUTCH PEDAL LOCK.
APPLICATION FILED AUG. 19, 1918.
1,317,396.
Patented Sept. 30, 1919.
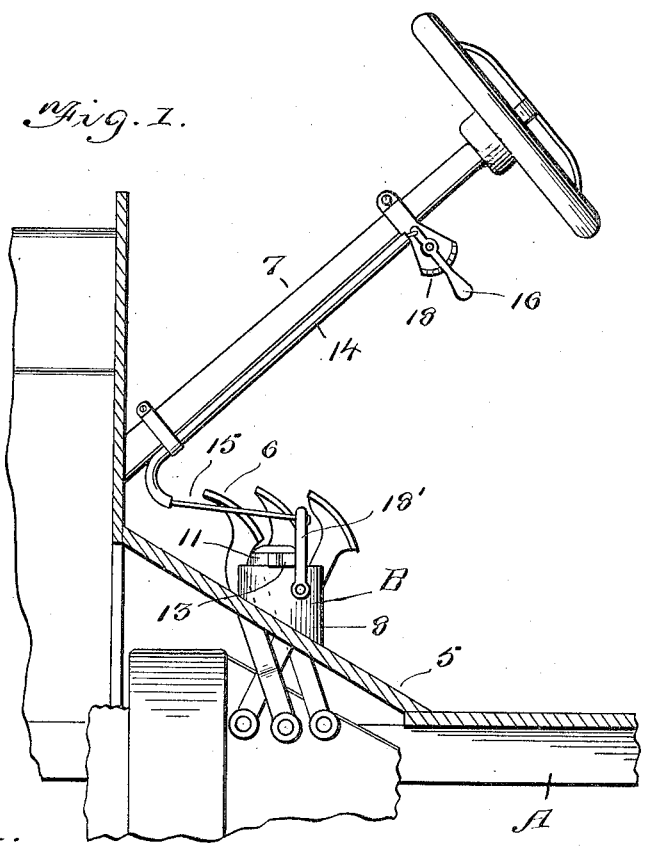
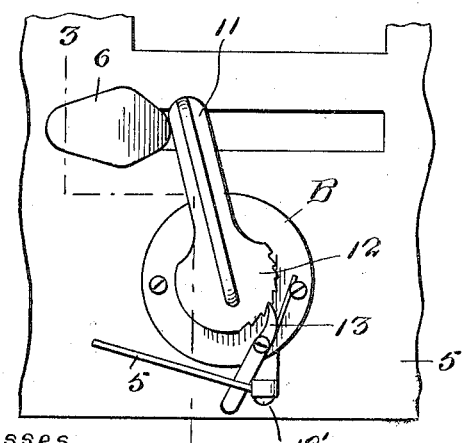
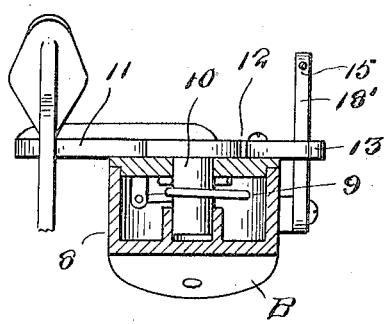
Witnesses
Inventor
H. W. Sanders
By Victor J. Evans
Attorney

UNITED STATES PATENT OFFICE.

HAROLD W. SANDERS, OF ROCHESTER, NEW HAMPSHIRE.

CLUTCH-PEDAL LOCK.

1,317,396.  Specification of Letters Patent.  Patented Sept. 30, 1919.

Application filed August 19, 1918. Serial No. 250,542.

*To all whom it may concern:*

Be it known that I, HAROLD W. SANDERS, a citizen of the United States, residing at Rochester, in the county of Strafford and State of New Hampshire, have invented new and useful Improvements in Clutch-Pedal Locks, of which the following is a specification.

This invention relates to a device which is intended to be employed as a lock for the pedal on a motor vehicle by which the speed of the vehicle is controlled.

The primary object of the invention is to provide an inexpensive and durable lock of this character which may be mounted upon the floor of the vehicle and is provided with a spring actuated pedal holding arm, which when the pedal which controls the speed of the vehicle is pushed forward to throw the vehicle into low speed, will automatically lock the pedal in forward position, thus insuring the vehicle traveling in low gear until a change of speed is desired without the necessity of the operator of the vehicle maintaining his foot upon the pedal.

Another object of the invention is to provide a lock for a pedal of this character which may be operated, either with the foot or from the steering post of the machine to allow the speed controlling pedal to return to neutral or high gear position.

With these and other objects in view the invention resides in the novel combination and arrangement of parts which will be hereinafter described and claimed.

The preferred embodiment of the invention has been illustrated in the accompanying drawings, although no restriction is necessarily made to the precise details of construction therein shown, as changes, and alterations within the scope of the claims may be resorted to if desired.

In the drawings:—

Figure 1 is a sectional view through a portion of the Ford automobile to which is shown applied a clutch pedal lock constructed in accordance with the invention.

Fig. 2 is a top plan view of the lock and a portion of the support upon which the lock is mounted.

Fig. 3 is an enlarged sectional view on the line 3—3 of Fig. 2.

Like characters of reference denote the corresponding parts throughout the various views in the drawing.

Referring now to the drawing in detail, the letter A designates a portion of a motor vehicle which in this instance has been shown as a Ford automobile and to which the lock B is primarily intended to be applied.

The portion of the motor vehicle shown in the drawing includes a floor 5 above which extends the pedal 6 by means of which the speed of the vehicle A is controlled. The pedal as is usual in machines of this character is located adjacent the post 7 to which the steering wheel is attached.

The lock B includes a base 8 which is secured to the inclined portion of the floor 5 and has disposed therein a spiral spring 9. One end of the spring 9 is secured to the wall of the housing 8 and the other end of the spring is fixed to a shaft 10 which extends within the housing 8 through an opening in the top thereof.

Fixed to the shaft 10 exteriorly of the housing 8 is a pedal holding arm 11 which is held firmly pressed against the shank of the pedal 6 by the spring 9. Formed on the underside of the arm 11 is a ratchet wheel 12, the teeth of which are adapted to be engaged by a spring pressed dog 13 pivotally mounted upon the top of the housing 8.

From the above described manner of mounting the arm 11 upon the housing 8 it will be apparent that when the operator of the vehicle moves the pedal 6 forward to throw the vehicle into low gear the spring will cause the arm 11 to follow the pedal while the dog 13 will prevent the spring which actuates the pedal 6 from moving the arm 11 when the operator releases his foot from the clutch pedal thus locking the pedal 6 in position to insure the vehicle traveling in low speed until a change of speed is desired.

Secured to the steering post 7 is a tubular casing 14 and through this casing operates a cable 15. One end of this cable is connected with an end lever 16, pivotally mounted upon a bracket arm secured to the steering post. The outer end of this bracket arm is provided with a segmental rack 18 adapted to be engaged by the end lever 16 to hold the latter in its adjusted position. The opposite end of the cable 15 is attached to a drip lug 18', which is pivotally mounted upon the base 8 and is adapted to engage the outer end of the dog 13 to rock the latter upon its pivot. By this means the driver of the vehicle may operate the lever 16 to move the lug 18' and release the dog 13, whereupon the arm 11 will be moved under the influence of the spring 9, permitting the pedal 6 to move rearward or toward the driver.

From the foregoing description taken in connection with the accompanying drawing it is apparent that a lock for the clutch pedal or motor vehicle has been provided which is so constructed that the pedal may be locked in position to maintain the car in low speed until a change of speed is desired or the clutch pedal may be locked in any position intermediate low and high speed.

Having described the invention, what I claim is:—

1. The combination with the speed controlling pedal of a motor vehicle, of a rotatably mounted arm, a spring adapted to hold one end of said arm in engagement with said pedal and means engageable with the opposite end for locking said arm against movement when said pedal is in adjusted position.

2. The combination with the speed controlling pedal of a motor vehicle, of a rigidly mounted base, a spring controlled shaft extending above said base, an arm on said shaft engaging said pedal, a ratchet wheel on said arm, a dog on said base engaging said wheel adapted to prevent movement of said arm when said pedal is in adjusted position, and means manually operable to disengage said dog from said wheel.

3. The combination with the speed controlling pedal of a motor vehicle, of a rotatable arm located in the path of movement of the pedal, spring actuated means for yieldingly holding the arm in contact with the pedal when the latter is depressed and means for automatically locking the arm against retrograde movement to hold the pedal in adjusted position.

4. The combination with the speed controlling pedal of a motor vehicle, of a rotatable arm located in the path of movement of the pedal, spring actuated means for yieldingly holding the arm in contact with the pedal when the latter is depressed, means for automatically locking the arm against retrograde movement and manually operated means connected to the arm locking means for releasing the latter.

5. The combination with the speed controlling pedal of a motor vehicle, of an arm mounted for rotation in a direction at right angles to and in the path of movement of the pedal, spring actuated means for rotating the arm to yieldingly follow the pedal when the latter is depressed and a spring pawl engageable with teeth surrounding one end of the rotatable arm to hold the latter in adjusted position.

In testimony whereof I affix my signature.

HAROLD W. SANDERS.

Copies of this patent may be obtained for five cents each, by addressing the "Commissioner of Patents, Washington, D. C."